Aug. 30, 1960 V. CICALA ET AL 2,950,884
REFUELING PROBE MAST
Filed Nov. 20, 1956 2 Sheets-Sheet 1
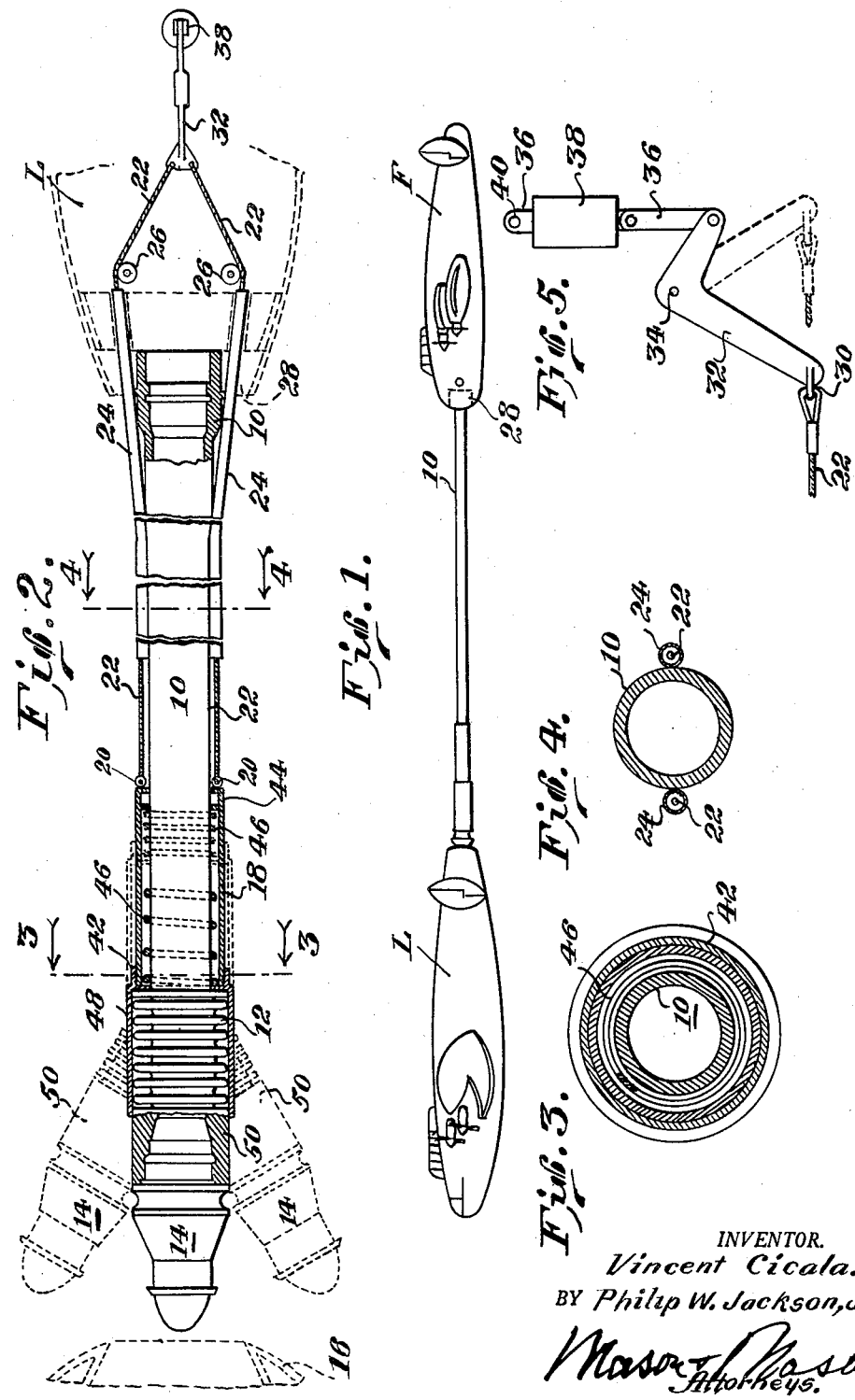
INVENTOR.
Vincent Cicala.
BY Philip W. Jackson, Jr.

Aug. 30, 1960 V. CICALA ET AL 2,950,884
REFUELING PROBE MAST
Filed Nov. 20, 1956 2 Sheets-Sheet 2
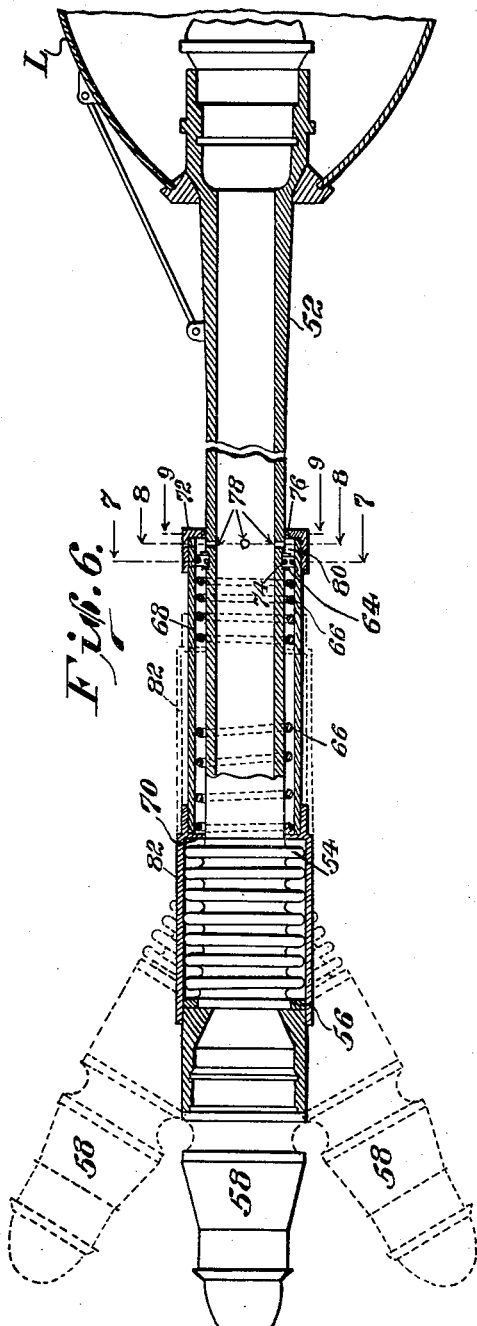
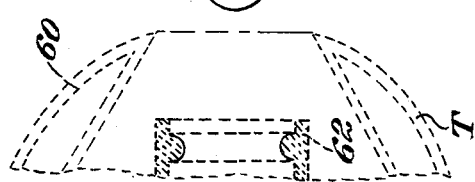
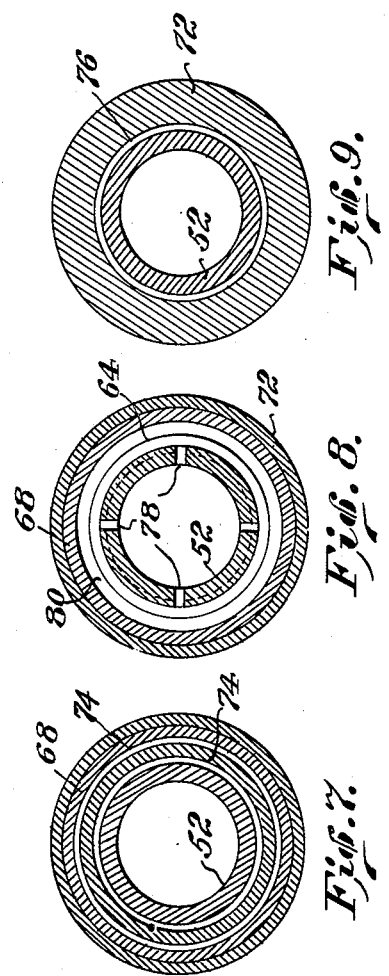
INVENTOR.
Vincent Cicala
BY Philip W. Jackson, Jr.
Mason + Mason
Attorneys.

United States Patent Office 2,950,884
Patented Aug. 30, 1960

2,950,884

REFUELING PROBE MAST

Vincent Cicala, Wheaton, and Philip W. Jackson, Jr., Rockville, Md., assignors, by mesne assignments, to Vitro Corporation of America, New York, N.Y., a corporation of Delaware Filed Nov. 20, 1956, Ser. No. 623,459

10 Claims. (Cl. 244—135)

This invention relates to a refueling probe mast for the in-flight fueling of aircraft, although the same may be used as a towing mast as well.

The principal object of the invention is to provide a refueling probe mast for in-flight refueling, which is rigid during probing. However, the mast may be changed to a "flexible" mast, such changing operation being accomplished by manual, or by automatic means, during refueling.

Other objects will appear hereinafter throughout the specification.

In the drawings:

Figure 1 is a perspective view of the two aircraft connected by the probing mast;

Figure 2 is a longitudinal vertical sectional view of one form of the mast showing in full lines the mast in rigid position, and in dotted lines the mast in several of its flexible positions;

Figure 3 is a transverse sectional view taken on the line 3—3 of Figure 2;

Figure 4 is a transverse sectional view of the mast shown in Figure 2;

Figure 5 is an enlarged detail view of part of the operational mechanism shown at the right of Figure 2;

Figure 6 is a vertical sectional view similar to Figure 2 of a second form of the invention;

Figure 7 is a transverse vertical sectional view taken on the line 6—6 of Figure 6;

Figure 8 is a transverse vertical sectional view taken on the line 8—8 of Figure 6; and Figure 9 is a transverse vertical sectional view taken on the line 9—9 of Figure 6.

The refueling probe mast of this invention reduces the possibility of damage to the receiver aircraft due to inadvertent maneuvers during fuel transfer. The use of such mast is rigid during the time of connection, but because it may be made "flexible" during fuel transfer, the separation of the receiver aircraft from the fueling aircraft becomes possible under conditions which would produce high side loads on a rigid probe mast. Such high-side loads result in the development of excessive separation loads. With a mast as described and claimed hereinafter, these difficulties are entirely overcome, and it becomes possible to make an accurate connection between the mast and the socket. Requirements indicate that the probe mast should have sufficient flexibility to permit deflections of 40°, and yet such mast should also have sufficient rigidity to withstand undesirable "flutter" tendencies.

In meeting these two basic requirements, it has been considered that a metal or substantially rigid probe should be used to avoid "flutter." Such probe should also have a manual or an automatic means, which when operated allows for deflection during refueling operations.

Conventional probe and drogue in-flight refueling is usually conducted at a relatively low airspeed due to limitations of the probe and drogue equipment. In some instances this is caused by the limited airspeed capabilities of the aircraft in which this equipment is installed. However, when high performance jet aircraft is used, in-flight fueling via probe and drogue, must be accomplished at an airspeed somewhat lower than the optimum airspeed required for effective aircraft control. Under such circumstances high closure rates are often experienced, and the sluggish response of aircraft controls occasionally results in the receiver inadvertently maneuvering out of the refueling envelope. This condition results in loads normal to the longitudinal axis being applied to the refueling probe mast. Since probe cannot be disengaged from the drogue in a misaligned configuration, the receiver aircraft is often damaged before corrective maneuvers can be effected.

The present invention overcomes these difficulties by providing a mast which is rigid until a connection has been made, following which the mast is caused to become "flexible" in such manner as to permit separation of probe and drogue, when inadvertent maneuvers or high closure rates result in misalignment of the probe and rogue during in-flight refueling operations.

Referring to the drawings, and particularly Figures 1 to 5 inclusive, L indicates the leading aircraft and F indicates the following aircraft. The leading aircraft is provided with a rigid probe mast 10 forming a conduit for fuel. This is substantially rigidly attached to the aircraft L. Either of these aircraft may be the tank plane, and the other the aircraft to be refueled. The drawings also show one aircraft with a receiver at the rear of its fuselage but such receiver may be located in any position on the aircraft. The probe has been shown in the nose, but can be located also in any position on the aircraft.

As viewed in Figure 2, the left end of the probe mast is provided with a metallic bellows, the right end of which is attached to the probe in a leak-proof manner. The bellows forms a continuation of the mast 10. On the left end of the bellows, is attached in a leak-proof manner a tapered nozzle 14, which is adapted to enter the drogue 16, and engage a socket member, not shown in this figure.

Referring again to Figure 2, 18 is a slidable primary sleeve having at the right end thereof cable attaching means 20 for a pair of cables 22 that extend through guides 24 rigidly mounted on the mast 10. At the right end of these guides is a pair of pulleys 26 that are mounted within a guide socket 28 on the aircraft F. The cables 22 are connected at 30 by an eye and loop to a bellcrank lever 32 pivoted at 34 on the aircraft F. The bellcrank lever is pivotally connected to a link 36 that extends through a guide 38 on said aircraft. The outward end of the link 36 has an eye 40 to which may be connected a control rod or cable readily accessible to the pilot of said aircraft.

As shown at the left in Figure 2, the slidable primary sleeve 18 is provided with a collar 42, and the mast 10 has a stationary collar 44. These collars are engaged by the opposite ends of a compressible spring 46, this spring being shown when uncompressed in full lines and in dotted lines, when compressed, in this figure. Rigidly mounted on the left end of the primary sleeve 18 is a secondary sleeve 48.

When the parts are in the full line position, secondary sleeve 48 has moved to its left-most position, and in this position it entirely covers the metallic bellows 12 and partially covers the right end portion 50 of the nozzle, its end portion being substantially cylindrical in cross section. When, however, the primary sleeve 18 is moved to the right it carries with it secondary sleeve 48. This action takes place when the cables 22 are pulled to the right, as shown in Figure 2, and in this position end portion 50 and the bellows 12 are uncovered whereby the nozzle 14 may have universal movement about the end of the probe. As shown in dotted lines, the nozzle may be moved either up or down, but it actually has universal movement about the end of the mast 10 during in-flight refueling operations. Thus, the flexible mast prevents damage to the receiver aircraft when misalignment of the probe and drogue occurs during in-flight refueling operations.

However, as soon as the probe and drogue have been disconnected from each other, and upon release of the link 36 by the pilot, the spring 46 will expand to cause the bellcrank lever 32 to move from the dotted line position to the full line position shown in Figure 5, and the primary and secondary sleeves 18 and 48 are caused to move to the left as shown in Figure 2 by the spring 46. When this occurs the bellows 12 and the cylindrical end of the probe 14 are covered by sleeve 48 thus changing the connection between the probe and nozzle from a "flexible" connection to a rigid one. This may occur as desired by the pilot of the aircraft on which the probe is mounted. We have therefore provided a manually controlled means for effecting this change from a "flexible" connection to an "inflexible" connection between the nozzle and its supporting probe.

The second form of the invention is shown in Figures 6 to 9 and this consists essentially of an automatic means for converting the connection between the nozzle and probe from an "inflexible" to a "flexible" connection between these parts.

As illustrated in these figures the mast is indicated by the numeral 52. Adjacent the left end of the mast, as shown in Figure 6, there is provided a bellows 54, the opposite end of the bellows being connected to a cylindrical end 56 attached to nozzle 58. It will be understood that the opposite ends of the bellows are connected in a fluid tight manner to the probe and nozzle.

This nozzle, when connected to a second aircraft, is guided by the drogue 60 having a socket 62.

The probe is provided with an external rigid collar 64 forming a seat for one end of the compressible spring 66. Slidably mounted on the probe and collar is a primary sleeve 68 having an inwardly turned end 70 at one end forming an abutment for one end of the spring. The other end of the spring abuts the collar 64. Both collar 64 and end 72 are provided with suitable leak-proof rings such as O-rings 74 and 76, respectively, in order to make a fluid-tight connection between the end of the primary collar 68 and the probe 52. As will be seen by reference to Figures 6 and 8 the mast 52 is provided with a plurality of apertures 78, here shown as four in number, which permit communication between the interior of the probe mast and the space 80 which is located between collar 64 and collar 72.

Primary sleeve 68 has rigidly attached to the left end thereof, as viewed in Figure 6, secondary sleeve 82 which normally extends over bellows 54 and cylindrical end 56 of the nozzle.

However, during the passage of fluid from one of the aircraft to the other aircraft through hollow mast 52, some of the fuel passes through the apertures 78 into the space 80 between the primary sleeve 68 and the outer circumferential portion of the mast. The pressure of this fluid is sufficient to cause sleeves 68 and 82 to move to the right so as to uncover the cylindrical end 56 of the nozzle and the bellows 54 thereby converting the connection between the mast and nozzle from a "rigid" to a "flexible" connection. When the flow of fuel has been stopped at the completion of the refueling operation the pressure of the fluid in the space 80 becomes less and less, whereupon spring 66 which up to this time has been compressed, as shown in dotted lines, expands to its full line position, forcing both sleeves to the left, whereby sleeve 82 covers bellows 54 and cylindrical end 56 of the nozzle 58.

It will be understood that other means may be used in place of the bellows 12 of Figure 1 and bellows 54 of Figure 6 to impart flexibility to the nozzles 14 and 58 respectively. In other words, any means that will make the nozzle flexible but which may be operated either manually or automatically, may be used in substitution of the flexible bellows shown such as universal joints of conventional type having a passageway therethrough, or shaft couplings of various types may be used in substitution of the bellows structure described, the principal requirement being that a fluid tight connection be maintained between the nozzle and the mast proper. The bellows structure illustrated may be made of metal or any other material suitable for the purpose, the essentials being that the material be both fluid proof and "flexible." Other locking means, either manually or automatically operable may be used in substitution for the slidable locking sleeves shown in Figures 2 and 6 of the drawings.

It will be appreciated that the showing in the drawings and in the above description, are purely illustrative, and not limiting, as various changes could be made within the scope of this invention. For instance the flexible connecting means, although shown as a bellows between nozzle and probe, could as readily be located between a socket means, such as shown at 62, and the supporting means of said socket means, and the two aircraft could be in any relative position, one to the other, the position shown in Figure 1 being merely illustrative of one of the positions the aircraft could assume during the in-flight refueling and or towing operation. Either of the planes could be provided with the probe mast and the other the drogue equipment.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

What is claimed is:

1. In combination with a first aircraft, a hollow probe mast for conducting fluid from said aircraft to a second aircraft, said probe mast comprising a rigid tube connected at one end to said first aircraft and extending therefrom, a rigid nozzle coupling means adapted to be inserted into a coupling socket carried by said second aircraft, and a flexible tube means connecting the other end of said rigid tube and one end of said nozzle coupling means in sealed relation thereto, means for locking said rigid tube and said nozzle coupling means in substantial alignment, said locking means comprising a rigid sleeve slidable axially on said rigid tube, one end of said sleeve when in one position on said rigid tube extending beyond the adjacent end of said rigid tube to span said flexible tube means and slidably engage the outer surface of said nozzle coupling means, spring means to normally hold said sleeve in said one position, and means for retracting said sleeve in the opposite direction against the force of said spring to free said nozzle coupling means and said flexible tube means so that said nozzle coupling means may move out of alignment with said rigid tube.

2. The combination of an aircraft and a hollow probe mast as defined in claim 1, wherein said means for retracting said sleeve is a manually operable means carried by said first aircraft.

3. The combination of an aircraft and a hollow probe mast as defined in claim 1, wherein said spring means to normally hold said sleeve in said one position is a coil spring mounted between said rigid tube and said sleeve, and said means for retracting said sleeve comprises cable means attached to one end of said sleeve and trained through guides carried on said rigid tube.

4. The combination of an aircraft and a hollow probe mast as defined in claim 1, wherein said flexible tube means is a bellows.

5. The combination of an aircraft and a hollow probe mast as defined in claim 1, wherein said means for retracting said sleeve comprises means responsive to the pressure of the fluid conducted through said hollow probe mast.

6. The combination of an aircraft and a hollow probe mast as defined in claim 5, wherein said means responsive to the pressure of the fluid in said hollow probe mast comprises a piston on said rigid tube and a cylinder formed by said rigid tube and said sleeve, said cylinder being in fluid communication with the fluid passage through said rigid tube by aperture means in its wall.

7. A hollow probe mast for conducting fluid from a first aircraft to a second aircraft, said probe mast comprising a rigid tube adapted to be connected at one end to said first aircraft and to extend outwardly therefrom, a rigid nozzle coupling means adapted to be inserted into a coupling socket carried by said second aircraft, and a flexible tube means connecting the other end of said rigid tube and one end of said nozzle coupling means in sealed relation thereto, means for locking said rigid tube and said nozzle coupling means in substantial alignment, said locking means comprising a rigid sleeve slidable axially on said rigid tube, one end of said sleeve when in one position on said rigid tube extending beyond the adjacent end of said rigid tube to span said flexible tube means and slidably engage the outer surface of said nozzle coupling means, spring means to normally hold said sleeve in said one position, and means for retracting said sleeve in the opposite direction against the force of said spring to free said nozzle coupling means and said flexible tube means so that said nozzle coupling means may move out of alignment with said rigid tube.

8. A hollow probe mast as defined in claim 7, wherein said spring means to normally hold said sleeve in said one position is a coil spring mounted between said rigid tube and said sleeve, and said means for retracting said sleeve comprises cable means attached to one end of said sleeve and trained through guides carried on said rigid tube.

9. A hollow probe mast as defined in claim 7, wherein said means for retracting said sleeve comprises means responsive to the pressure of the fluid conducted through said hollow probe mast.

10. A hollow probe mast as defined in claim 9, wherein said means responsive to the pressure of the fluid in said hollow probe mast comprises a piston on said rigid tube and a cylinder formed by said rigid tube and said sleeve, said cylinder being in fluid communication with the fluid passage through said rigid tube by aperture means in its wall.

References Cited in the file of this patent

UNITED STATES PATENTS

| | | |
|---|---|---|
| 1,102,863 | Bojas | July 7, 1914 |
| 1,743,241 | Schmidt | Jan. 14, 1930 |
| 2,663,523 | Leisy | Dec. 22, 1953 |
| 2,728,590 | Macgregor | Dec. 27, 1955 |